United States Patent
Sperrer (10) Patent No.: US 9,296,029 B2
(45) Date of Patent: Mar. 29, 2016

(54) CONTROL AND REGULATING DEVICE FOR A BENDING PRESS

(75) Inventor: Gerhard Sperrer, Oberschlierbach (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 402 days.

(21) Appl. No.: 13/994,265

(22) PCT Filed: Dec. 19, 2011

(86) PCT No.: PCT/AT2011/050054
§ 371 (c)(1),
(2), (4) Date: Jul. 23, 2013

(87) PCT Pub. No.: WO2012/079109
PCT Pub. Date: Jun. 21, 2012

(65) Prior Publication Data
US 2013/0298624 A1    Nov. 14, 2013

(30) Foreign Application Priority Data
Dec. 17, 2010   (AT) ................. A 2088/2010

(51) Int. Cl.
*B21D 5/00* (2006.01)
*B21D 55/00* (2006.01)
*G05B 19/19* (2006.01)

(52) U.S. Cl.
CPC ...... *B21D 5/004* (2013.01); *B21D 5/00* (2013.01); *B21D 55/00* (2013.01); *G05B 19/19* (2013.01)

(58) Field of Classification Search
CPC .......... B21D 5/00; B21D 5/004; B21D 55/00; B21D 5/002; B21D 5/02; B30B 15/144; B30B 15/161; G05B 19/19; G05B 19/82
See application file for complete search history.

(56) References Cited

U.S. PATENT DOCUMENTS

| 3,210,712 | A | * | 10/1965 | Goff ............................. 338/198 |
| 4,608,852 | A | * | 9/1986 | Kogure et al. ............... 72/389.3 |
| 4,656,862 | A | | 4/1987 | Kogure et al. |
| 4,983,901 | A | | 1/1991 | Lehmer |
| 5,316,707 | A | * | 5/1994 | Stanciu et al. ............... 264/40.1 |
| 6,591,651 | B2 | * | 7/2003 | Kutschker et al. ............. 72/101 |
| 7,963,137 | B2 | * | 6/2011 | Braune et al. ................ 72/31.11 |
| 8,720,243 | B2 | * | 5/2014 | Sperrer ......................... 72/20.1 |
| 8,931,317 | B2 | * | 1/2015 | Ikeda ............................ 72/18.2 |
| 2008/0007417 | A1 | | 1/2008 | Weishaar et al. |

FOREIGN PATENT DOCUMENTS

CN       101146630 A       3/2008
FR       2748831 A1  *    5/1996    ............... G05G 7/02

OTHER PUBLICATIONS

International Search Report of PCT/AT2011/050054, date of mailing May 4, 2012.
International Preliminary Report on Patentability of PCT/AT2011/050054, Jul. 2, 2013.

* cited by examiner

*Primary Examiner* — Edward Tolan
(74) *Attorney, Agent, or Firm* — Collard & Roe, P.C.

(57) ABSTRACT

The invention relates to a control and regulating device for a drive arrangement of a displaceable press beam of a bending press in particular a press brake, comprising a protective housing having an access orifice for a foot of an operator, and comprising a pedal-type actuating element disposed in the protective housing At least one detection means connected so as to communicate with a control and monitoring system of the bending press is assigned to the actuating element and is provided in the form of a motion profile detection means.

20 Claims, 4 Drawing Sheets

CONTROL AND REGULATING DEVICE FOR A BENDING PRESS

CROSS REFERENCE TO RELATED APPLICATIONS

This application is the National Stage of PCT/AT2011/050054 filed on Dec. 19, 2011, which claims priority under 35 U.S.C. §119 of Austrian Application No. A 2088/2010 filed on Dec. 17, 2010, the disclosure of which is incorporated by reference. The international application under PCT article 21(2) was not published in English.

The invention relates to a control and regulating device for a bending press, as well as a method of operating the bending press by means of the control and regulating device.

A control console and/or a two-position or three-position control device hard-wired or wirelessly connected so as to communicate with a control and monitoring system of the bending press, operated by a foot via a pedal-type actuating element, is known from the prior art as a means of operating a bending press in order to run a forming operation on a workpiece. With a view to increasing safety for an operator, a three-position switching device is most often used, with a first position of the pedal-type actuating element for when the displaceable press beam is stationary in an initial position, a control range in which a control program for operation is retrieved and in which the displacement speed of the displaceable press beam can be manually controlled by displacing the actuating element, and a third position of the actuating element in which an emergency stop of the displaceable press beam is activated in the event of a risk to the operator or a dangerous operating state. The disadvantage of this type of switching device is that during a displacement distance by which the actuating element has to be moved until a position in which the emergency stop is activated, a time delay occurs during which the press beam continues to be moved and, in addition to which the displacement speed of the displaceable press beam is further increased. A bending press of this type is known from U.S. Pat. No. 4,656,862.

The objective of the invention is to propose a control and regulating device for a bending press, whereby a control sequence pre-programmed for a specific workpiece can be manually influenced by an operator whilst nevertheless conforming to safety requirements.

This objective of the invention is achieved on the basis of a detector being provided in the form of a motion profile detector connected so as to communicate with a logic module incorporating a detection and evaluation circuit. The advantage of this approach is that control signals for regulating a drive arrangement for the displacement operation of the press beam are generated directly from a displacing movement of the actuating element operated by the operator of the bending press and, by detecting and evaluating a motion profile of the actuating element and permanently comparing it with a default profile or a predefined threshold value, an emergency stop is activated in the event of a displacing movement of the actuating element which exceeds the default profile or threshold value, and is so irrespective of an instantaneous position of the actuating element and virtually without a reaction time and hence without any continuing movement of the press beam or preceding change in displacement speed, thereby resulting in a safe and rational operation of the bending press.

In this respect, an embodiment in which the logic module is disposed in the protective housing of the control and regulating device is of advantage, whereby a control and regulating unit is obtained which is suitable for retro-fitting on already existing control and monitoring systems of bending presses.

However, another embodiment is possible, whereby key components such as the logic module of the control and regulating unit are integrated in the control and monitoring system.

Also of advantage are the embodiments in which the motion profile detector is provided in the form of an acceleration sensor coupled with the actuating element so as to move in unison with it, or in which the motion profile detector is configured to detect a displacing movement of the actuating element via a linear potentiometer, or in which the motion profile detector is configured to detect a displacing movement of the actuating element via a rotary potentiometer, or in which the motion profile detector is configured to detect a displacing movement of the actuating element via an incremental rotary position transducer, or in which the motion profile detector is configured to detect a displacing movement of the actuating element via an incremental linear distance measuring system, or in which the motion profile detector is configured to detect a displacing movement of the actuating element via a scanner, or in which the motion profile detector is provided in the form of a piezoelectric measuring sensor such as a micro-electro-mechanical system, because they enable essential variants for user-specific control defaults to be obtained.

Also of advantage is an embodiment in which the detection and evaluation circuit has a processor, because a high number of different automatic control operations can be provided, thereby enabling the control and regulating device to be easily adapted to different control operations.

Likewise of advantage is an embodiment in which the actuating element is mounted in a pivot bearing arrangement in the protective housing so as to be pivotable against the action of a rebound force of a spring arrangement about a pivot angle so as to be displaceable from an initial position into an end position, or in which the motion profile detector is integrated into the pivot bearing arrangement, or in which the motion profile detector is integrated into a linear guide arrangement of an actuator drive, resulting in a simple and durable mechanical design of the control and regulating device.

Finally, an embodiment in which output and input interfaces of the logic module of the control and regulating device and the control and monitoring system of the bending press each have a signal transmitting and receiving module is of advantage because a rapid positioning of the control and regulating device at the respective operator position is achieved and a cable connection which might represent a safety risk, e.g. involving tripping over cables, damage to cables, etc., can be dispensed with.

The objective of the invention is also achieved by a method in which position-related control signals are detected in a displacement range of the actuating element limited by end positions of the actuating element by at least one motion profile detection means connected so as to move in unison with the actuating element and are generated as control signals in a processor of a detection and evaluation circuit connected so as to communicate with the motion profile detection means in order to regulate the speed of a displacing movement of a displaceable press beam of the bending press and forwarded to the control and monitoring system of the bending press, and the displacement speed of the press beam for a defined stroke range of an overall displacement cycle of the press beam is regulated on the basis of these control signals irrespective of data pertaining to the displacement speed stored in a data memory of the control and monitoring system as part of a program.

Also of advantage are features of the control signals being generated from a current intensity potential of the motion profile detector applied to the logic module incorporating the detection and evaluation circuit, or the control signals being generated from a current-voltage potential of the motion profile detector applied to the logic module incorporating the detection and evaluation circuit, or the control signals being generated from data of an angle of rotation transducer connected to the detection and evaluation circuit of the logic module, because they result in essential variants for user-specific control defaults.

However, the features are also of advantage, whereby an acceleration profile of the displacing movement of the actuating element in the displacement range of the actuating element between the end positions is determined in the detection and evaluation circuit of the logic module from a time-related signal sequence of the motion profile detection means and compared with a stored threshold value, and a control signal in the form of an emergency stop signal is generated if the threshold value is exceeded and forwarded to the control and monitoring system of the bending press, thereby enabling predefined safety requirements to be exactly achieved.

Other possible advantageous features are that the acceleration profile of the actuating element is determined in a processor of the logic module from a function of Delta "v (velocity)" to Delta "t (time)" from the motion profile of the actuating element and compared with the predefined threshold value for the displacing movement of the actuating element, and if the threshold value is exceeded, the control signal in the form of an emergency stop signal is generated in the detection and evaluation circuit and transmitted to the control and monitoring system of the bending press so that a control curve derived from an actuating movement of the actuating element constitutes an unmistakable control parameter for an emergency stop signal for the drive controller of the displacing movement of the press beam.

Finally, however, the features are also of advantage, whereby the acceleration profile of the actuating element is generated in the logic module on the basis of measurement values of an acceleration sensor, in particular a micro-electro-mechanical system, thereby simplifying the tasks of signal evaluation and detecting the motion of the actuating element.

To provide a clearer understanding, the invention will be described in more detail below with reference to the appended drawings.

The latter are highly schematic, simplified diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Figure 1:
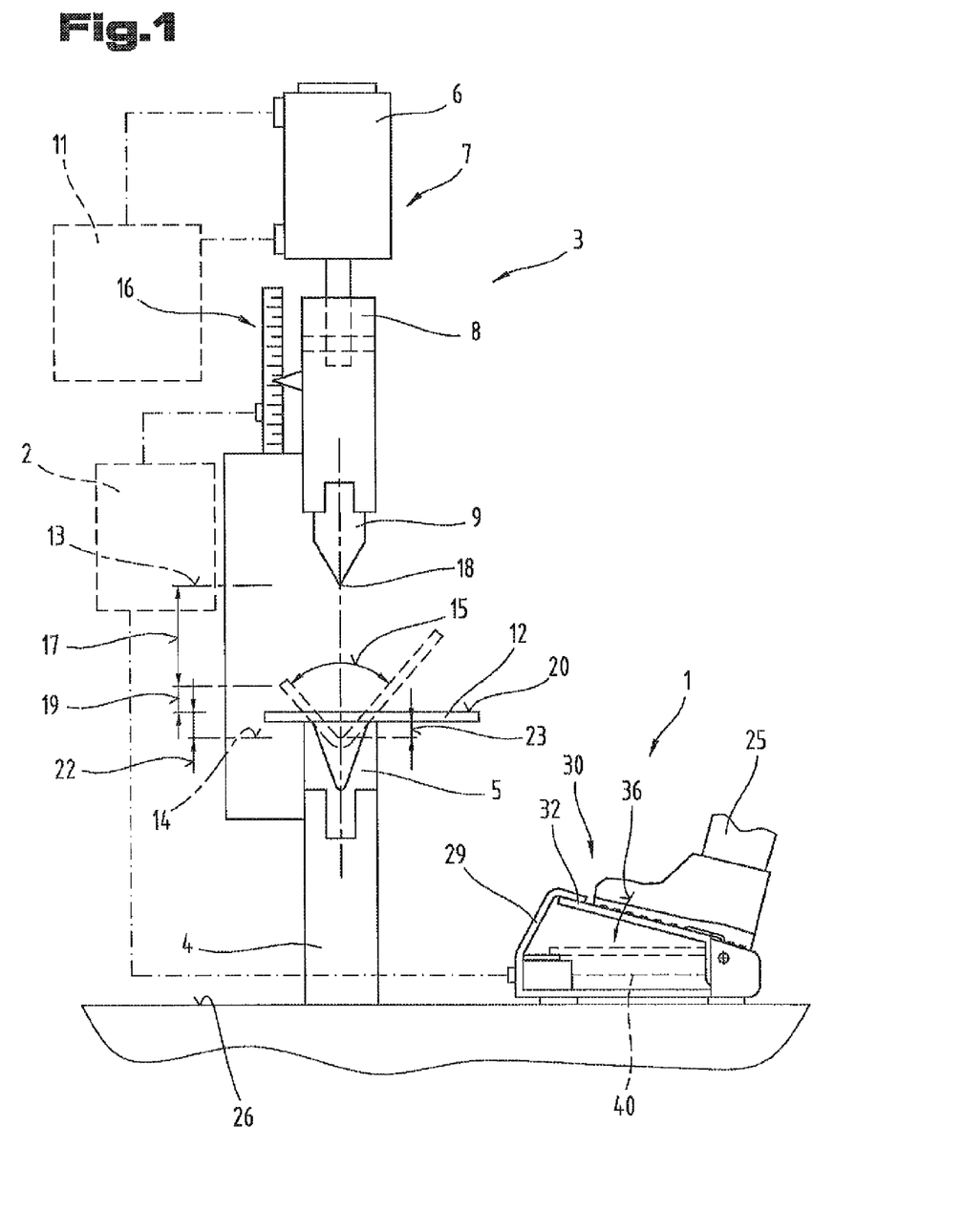
FIG. 1 a bending press with the control and regulating device proposed by the invention.

FIG. 1 illustrates a control and regulating device 1 which is connected so as to communicate with a control and monitoring system 2 of a bending press 3.

The bending press 3 is illustrated in a simplified format and has a stationary press beam 4 with a bending die 5 and a press beam 8 that is displaceable relative to the latter, likewise equipped with a bending die 9, with a drive means 6 of a drive arrangement 7. The drive means 6 for displacing the press beam 8 in the embodiment illustrated as an example is provided in the form of a hydraulic cylinder 10 to which pressurizing medium is applied by means of a hydraulic system 11. Naturally, it would also be possible to opt for other drive arrangements 7, such as, for example, a spindle drive driven by an electric motor, an eccentric drive, etc., as a means of driving the press beam 8.

The hydraulic system 11, respectively an electric drive, is activated via the control and monitoring system 2 on the basis of a control program predefined for a forming operation specifically devised for a workpiece 12, which can be manually initiated and retrieved via the control and regulating device 1 by an operator, a means of manually influencing the control operation being provided on the basis of the operating mode and design of the control and regulating device 1, as will be described in more detail below.

Having called up a displacement cycle for forming the workpiece 12 placed between the bending dies 5, 9, a displacement is then effected from a top end position 13 of the press beam 8 into a bottom end position 14 in which the bending die 9 of the displaceable press beam 8 is moved down into the bending die 5 of the stationary press beam 4 to a predefined depth, thereby forming an angle in the workpiece 12, followed by a return stroke into the top end position 13.

Accordingly, the bottom end position 14 depends on the geometry of the bending dies 5, 9, and a predefined bending angle 15 and is controlled by the program specific to the workpiece 12 by means of a distance measuring system connected to the control and monitoring system 2, for example.

In terms of control, the displacement of the press beam 8 incorporating the die 9 across its full stroke between the top end position 13 and the bottom end position 14 is sub-divided into a fast stroke range 17 by means of which the die tip 18 is moved to a distance 19 with respect to a top face 20 of the workpiece 12, a contact stroke 21 whereby the die tip 18 is placed in contact with the top face 20 of the workpiece 12 and a forming stroke 22 during which the die tip 18 is moved down by an immersion depth 23 into a V-shaped female die opening 24 and thus reaches the bottom end position 14.

Starting from the bottom end position 14, there then follows a likewise controlled return stroke of the press beam 8, optionally based on a releasing stroke and subsequent return stroke, back to the top end position 13, thereby terminating a displacement cycle.

In the embodiment illustrated as an example, the displacement cycle is triggered or initiated via the control and regulating device 1, connected to the control and monitoring system 2, disposed on a standing surface 26 in the immediate operating area of the bending press 3 so that it can be operated by a foot 25 of an operator, not illustrated, and which is mounted on a standing surface 26 which is ergonomically positioned for the operator and which can be moved to other locations.

However, another option would be for the control and regulating device 1 to be disposed directly on a front face of the stationary press beam 4 of the bending press 3, for example on a linearly displaceable carriage, to enable it to be ergonomically positioned by the operator in its position at the respective working position.

Figure 2:
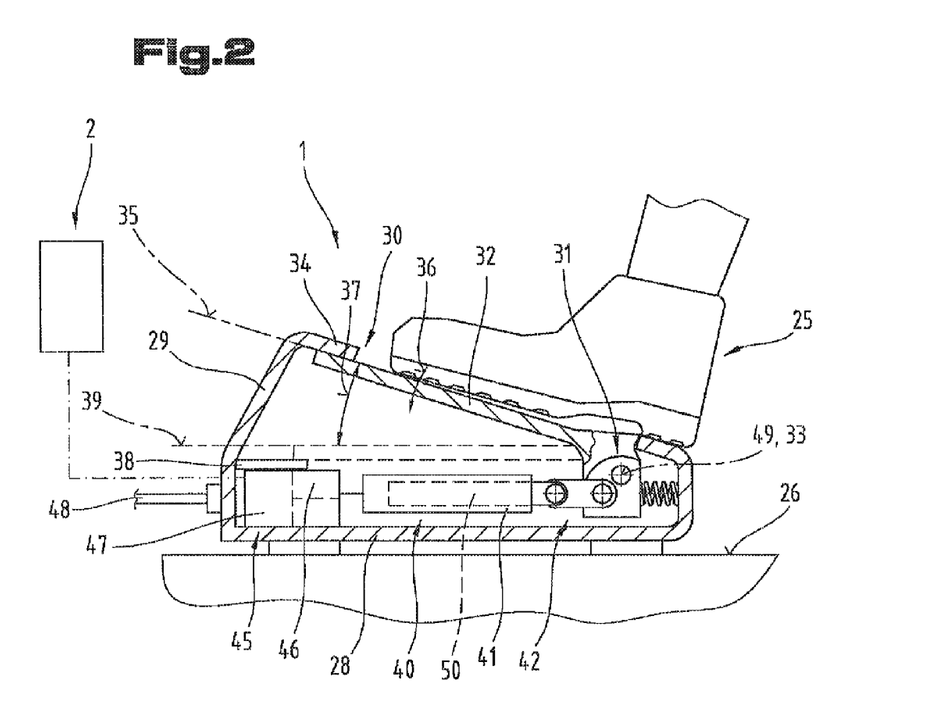
FIG. 2 a partial section illustrating the control and regulating device proposed by the invention.

In the embodiment illustrated as an example, the control and regulating device 1 has a protective housing 27 which can be mounted on the standing surface 26, comprising a base plate 28 and a housing top part 29 provided with an access orifice 30 for the foot 25 of the operator.

In the interior of the housing top part 29, a pedal-type actuating element 32 is pivotably mounted on the base plate 28 in a pivot bearing arrangement 31, which is disposed in an inclined position across the access orifice 30 for operating with the foot 25 due to a spring arrangement 33 acting against a stop means 34, for example a web of the housing top part 29, the inclined position being a first end position 35.

Starting from this end position 35, the actuating element 32 can be pivoted by applying a force—indicated by arrow 36—with the foot 25 about an angle 37 against the action of the spring arrangement 33, preferably with a progressive spring characteristic curve, against another stop means 38 disposed in the housing top part 29, into another end position 39.

Affixed in the protective housing 27 is a motion profile detection means 40, for example to the base plate 28, which, in the embodiment illustrated as an example here, is a linear potentiometer 41. The pivoting movement of the actuating element 32 is transmitted via an actuator drive 42 to the linear potentiometer 41 in order to output a control signal to the control and monitoring system.

The control signal might be a current signal in the case of an inductive, or voltage signal in the case of a capacitive motion profile detection means 40.

Also disposed in the protective housing 29 is a logic module 45 with a processor 46 wired to the motion profile detection means 40, e.g. the linear potentiometer 41, and a detection and evaluation circuit 47. The logic module 45 is connected to the control and monitoring system 2 of the bending press 3 by means of a line 48, for example. Naturally, it would also be possible to provide a wireless communication connection, e.g. radio, light-based, etc.

The pivoting movement of the actuating element 32 about a pivot axis 49 is transmitted via the actuator drive 42, for example an articulated connection in the form of a mechanical coupling, to an actuator 50 of the linear potentiometer 41 in order to emit a position-related control signal corresponding to the position of the actuating element 32.

A control signal for a stop position of the press beam 8 is assigned to the end positions 35, 39, and the end position 35 corresponds to the initial position of the press beam, in other words the top end position 13, and the end position 39 corresponds to an emergency stop to enable a stoppage for safety reasons, in which the press beam 8 is either halted in the position assumed at that instant or is reversed into its top end position 13 by a return stroke.

On the basis of the control signal emitted by the motion profile detection means 40 or linear potentiometer 41 when the actuating element 32 is deflected out of its end position 35 by applying a displacement force—indicated by arrow 36—in the direction of the other end position 39, the forming cycle is forwarded via the logic module 45 incorporating the processor 46 and the detection and evaluation circuit 47 to the control and monitoring system 2 and the motion sequence of the displaceable press beam 8 is initiated in accordance with the program defaults stored for the corresponding forming operation.

Instead of the described linear potentiometer 41, it would also be possible to use an incremental linear distance measuring system as a motion profile detection means 40.

The displacement cycle for a forming stroke and return stroke of the displaceable press beam will now be explained in more detail with reference to the diagram illustrated in FIG. 3.

The diagram shows the displacement speed of the press beam in solid lines, e.g. [mm/s], in the individual stroke ranges, e.g. [mm], for example for a specific forming operation on a workpiece stored in a data memory of the control and monitoring device of the bending press.

As already described in connection with FIG. 1, the displacement ranges essentially start from the top end position 13 of the press beam 8 the fast stroke range 17, whereby the die tip 18 of the bending die 9 is moved as far as the distance 19 from the top face 20 of the workpiece 12 to be formed by means of a displacement of the press beam 8 at a relatively high displacement speed V1 [mm/s] b, the distance 19 representing a predefined safety distance intended to prevent injury to operating personnel in the event of incorrect operation;

the latter is followed by a contact stroke 52 whereby the tip 18 of the bending die 9 is moved at a significantly reduced displacement speed V2 [mm{s] until the tip 18 sits on the top face 20 of the workpiece 12;

having placed the die tip 18 in contact with the top face 20 of the workpiece 12, the actual forming stroke 22 now takes place, optionally at a higher displacement speed V3 [mm/s] than that of the contact stroke 52 until the immersion depth 23 is reached, the latter depending on a die geometry, workpiece thickness, the predefined bending angle and any relevant material parameters, thereby reaching the end position 14, also referred to as the reversing point;

with effect from the so-called reversing point and once the bottom end position 14 is reached, a return stroke 53 of the press beam 8 is then effected at a relatively high speed V4 [mm/s] until the top end position 13 is reached.

The return stroke 53 is optionally followed by a releasing stroke to relieve the tension of the bending press and workpiece producing a so-called rebounding effect, the latter being crucial for angle control and hence for controlling the forming quality on the basis of an angle measuring operation.

Figure 3:
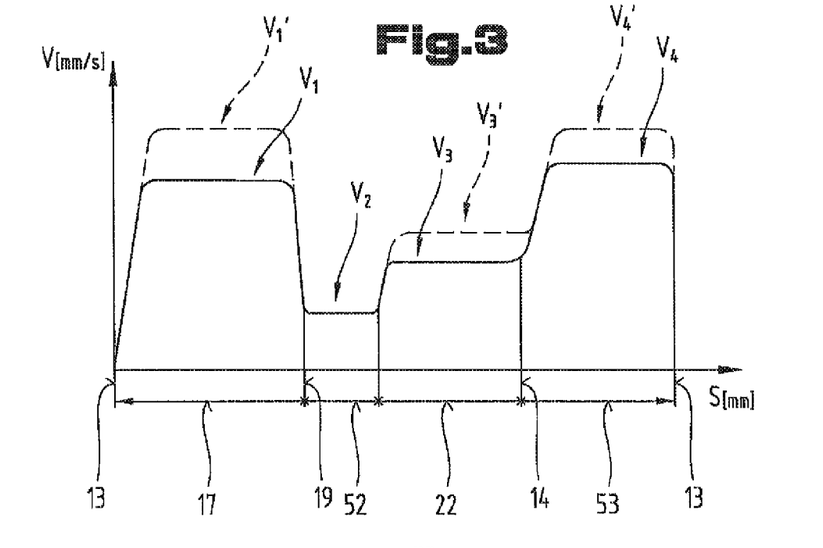
FIG. 3 a diagram illustrating speed control by means of the control and regulating device proposed by the invention for the displaceable press beam of the bending press.

For control purposes, as also illustrated by broken lines in FIG. 3, a manual speed regulation of the displacement of the press beam 8 can be undertaken for the predefined displacement ranges, in particular for the range of the fast stroke 17, return stroke 53 and forming stroke 22, via the position of the actuating element 32.

In these ranges, the predefined displacement speed "V" [mm/s] of the press beam 8 can be increased manually, depending on the position of the actuating element 32, in order to reduce the cycle time.

This switchover is made via the position-dependent control signals of the motion profile detection means 40 and the detection and evaluation circuit 47 of the logic module 45.

Furthermore, when the actuating element 32 reaches the end position 39, a control signal is generated at the control and monitoring system 2 via the control and regulating device 1 and the motion profile detection means 40, which causes an emergency stop.

The system is advantageously such that a higher resistance to displacement has to be overcome in order for the actuating element 32 to reach end position 39, e.g. due to a braking means opposing the pivoting movement of the actuating element, as a result of which the operator is provided with an indication of the end of the regulating range for the displacement speed.

The emergency stop can lead to the remaining motion sequence being halted on the one hand, as a result of which when the signal is triggered, the position reached by the press beam 9 is either maintained or switched to a return stroke 53 and the press beam 9 is returned to its top end position 13.

Another function of the control and regulating device 1 incorporating the motion profile detection means 40 and the detection and evaluation circuit 47 of the logic module 45 is provided whereby, in the event of a panic reaction on the part of the operator in a dangerous situation in which the actuating element 32 is intuitively pushed in the direction of the end position, a change in the control signal is retrieved from the position-dependent control signal of the motion profile detection means 40, e.g. current intensity, voltage, etc., by reference to a unit of time, e.g. [ms], in other words a control curve, and the acceleration of the displacing movement of the actuating element 32 is detected in the detection and evaluation circuit 40 as an actual value and compared with a predefined acceleration threshold value, and if the actual value exceeds the predefined acceleration threshold value, a signal for an emergency stop is generated, thereby halting the displacing movement of the press beam 8, irrespective of the instantaneous position of the actuating element.

The emergency stop procedure is activated immediately, regardless of the instantaneous position of the actuating element 32, if it is established that the threshold value has been exceeded—and the position-dependent or displacement-dependent speed regulation for the displacing movement of the press beam assigned to the positioning range is deactivated. Accordingly, the press beam is instantaneously stopped without any further movement to speak of.

Figure 4:
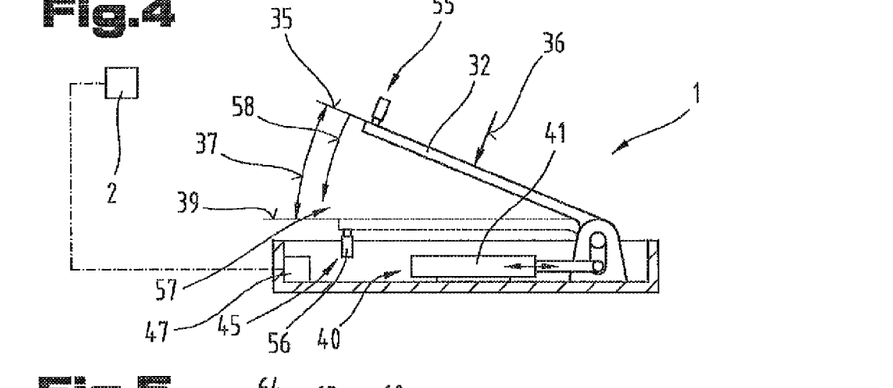
FIG. 4 a functional diagram of the control and regulating device proposed by the invention.

FIG. 4 is a simplified diagram illustrating the control and regulating device 1 and reference will be made to the diagram shown in FIG. 5 to explain one possible regulating operation for a manual speed regulation in the predefined stroke ranges already defined above.

Based on the embodiment illustrated as an example here, switch means 55, e.g. an end switch 56, proximity switch, etc., are provided at the end positions (35, 39) of the pedal-type actuating element 32, and when the actuating element 32 comes into contact with them, a stop signal is emitted for the displacement of the press beam, which is not illustrated here.

In a displacement range 57 in the angle 37 between the end positions (35, 39), when the actuating element is operated and with the progressive angular position—indicated by arrow 58—control signals are forwarded via the motion profile detection means 40, e.g. linear potentiometer 41, for the manual speed regulation in the predefined stroke ranges detected by the distance measuring system, not illustrated, with an increasing signal intensity, e.g. in the form of current intensity "I", or voltage in the case of capacitive detection means, to the logic module 45 incorporating the detection and evaluation circuit 47 and are emitted das control signals to the control and monitoring system 2 of the bending press 3 connected in a communicating arrangement to the logic module 45.

Figure 5:
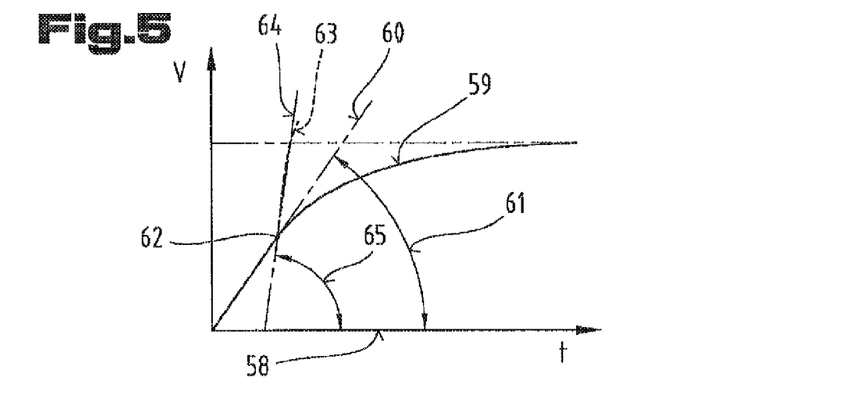
FIG. 5 a diagram representing a motion profile of an actuating element of the control and regulating device proposed by the invention.

The diagram—FIG. 5—illustrates one possible motion sequence of a displacing movement of the actuating element and the curve plots a control curve 59 of a signal intensity of the motion profile detection means 40 as a function of the increasing angular position of the actuating element 32.

A threshold value for a fixed maximum acceleration—in the form of curves-straight gradient 60 with the gradient angle 61 in the diagram—FIG. 5—is also stored in the detection and evaluation circuit 47 as a control parameter.

If the threshold value is exceeded, e.g. in the event of a panic reaction on the part of an operator—point 62—when a dangerous situation occurs in which the actuating element 32 is intuitively moved saccadically by applying an operating force—indicated by arrow 36—thereby causing the predefined threshold value to be exceeded, illustrated by the change in the curve in broken lines—indicated by 63—for the acceleration "B" and a resultant straight gradient 64 with a gradient angle 65 in the diagram, a control signal for an emergency stop is generated in the detection and evaluation circuit 47 and forwarded to the control and monitoring system 2 of the bending press, and the displacing movement of the press beam is instantaneously halted.

Figure 6:
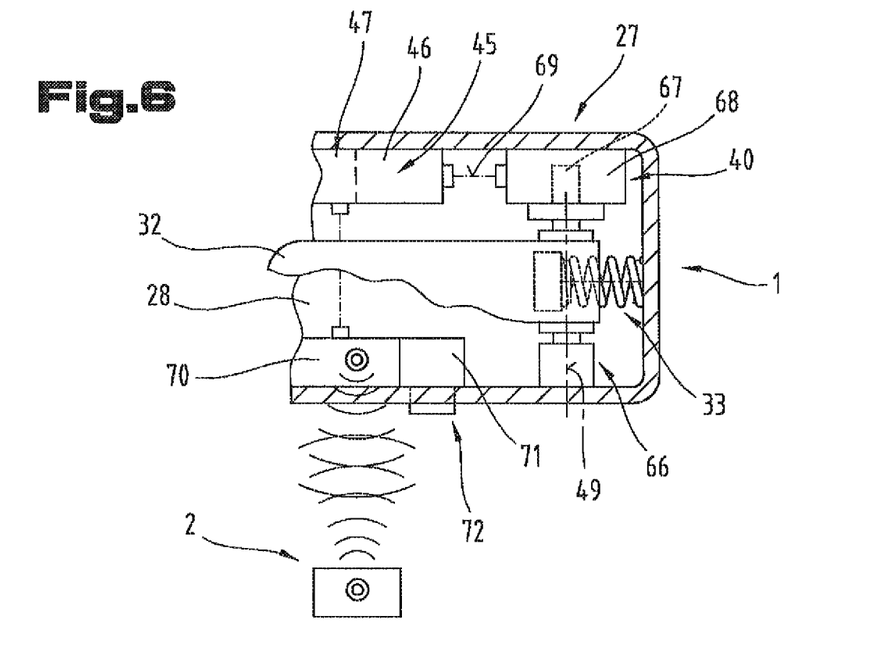
FIG. 6 a partial section illustrating another embodiment of the control and regulating device proposed by the invention.

FIG. 6 illustrates another embodiment of the control and regulating device 1 in a plan view onto a part-region with the protective housing 27 open.

The pedal-type actuating element 32 is mounted in the protective housing 27 so as to pivot about the pivot axis 49 of a pivot bearing arrangement 66 and is oriented at an angle in an inclined position by means of the spring arrangement 33, as described above, and can be pivoted against the force of the spring arrangement 33 in the direction of the base plate 28.

Disposed in a flush arrangement with the pivot axis 49 in the protective housing 27 is the motion profile detection means 40, a rotary potentiometer 68 which is coupled with a stub shaft 67 of the pivot bearing arrangement 66 so as to move in unison with it.

The rotary potentiometer 68 generates control signals via a line 69 for the speed regulation and emergency stop function in conjunction with the logic module 45 incorporating the processor 46 and the detection and evaluation circuit 47 depending on the pivoting movement of the actuating element 37 as already described above, which, in the embodiment illustrated as an example here, are forwarded via a signal-transmitting and signal-receiving module 70 to the control and monitoring system of the bending press, although the latter is not illustrated.

As may also be seen from this embodiment of the control and regulating device 1, the power supply is provided by means of a rechargeable energy storage 71, e.g. accumulator, disposed in the protective housing 27, which is provided with a docking means 72 extending through the protective housing 27 for feeding in energy.

Instead of the described rotary potentiometer 68, it would naturally also be possible to use an incremental rotary position transducer as the motion profile detection means 40.

Figure 7:
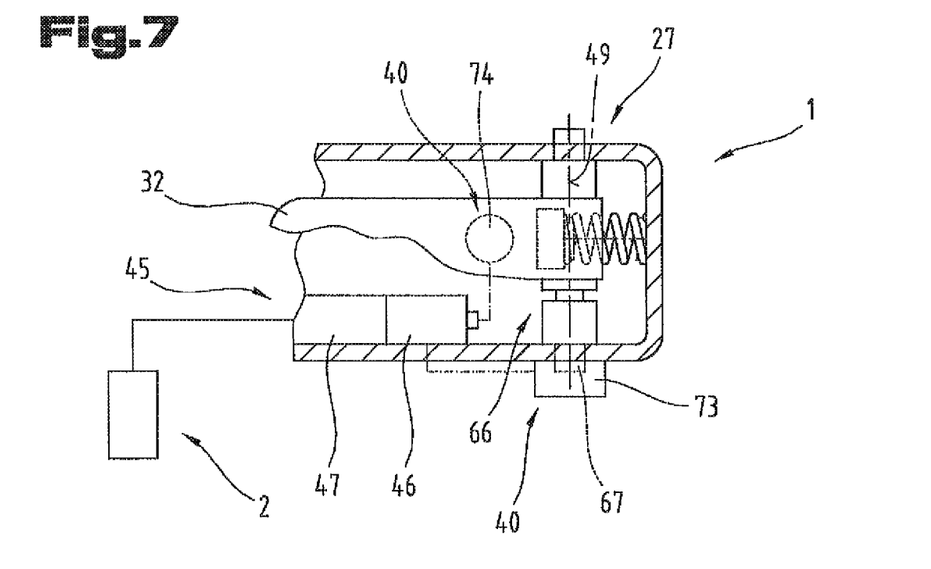
FIG. 7 a partial section illustrating another embodiment of the control and regulating device, proposed by the invention.

FIG. 7 is a plan view illustrating a different embodiment of the control and regulating device with the protective housing 27 open and showing a part-region.

In the embodiment illustrated as an example here, in addition to an angle of rotation transducer 73 for generating signals, connected to the logic module 45 incorporating the processor 46 and the detection and evaluation circuit 47 and in this instance flange-mounted outside the protective housing 27 and drivingly connected to the stub shaft 67 of the pivot bearing arrangement 66, another motion profile detection means 40 is provided for the pivoting movement of the actuating element 32, in the form of an acceleration sensor 74 secured to the bottom face of the actuating element, which is also wired to the logic module 45.

By means of this acceleration sensor 74, for example a piezoelectric acceleration sensor, a default value for an acceleration can be determined directly and independently of the generated control signals for regulating the displacement speed of the press beam in the event of an accelerating movement of the actuating element 32 caused when the actuating element 32 is operated due to a panic reaction, as described above, and a corresponding control signal can be generated in the detection and evaluation circuit 47 for an emergency stop of the press beam and forwarded to the control and monitoring system 2 of the bending press.

The embodiments illustrated as examples represent possible variants of the control and regulating device, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the control and regulating device, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 2; 6; 7 constitute independent solutions proposed by the invention in their own right. The objectives and associated solutions proposed by the invention may be found in the detailed descriptions of these drawings.

| List of reference numbers | |
|---|---|
| 1 | Control and regulating device |
| 2 | Control and monitoring system |
| 3 | Bending press |
| 4 | Press beam |
| 5 | Bending die |
| 6 | Drive means |
| 7 | Drive arrangement |
| 8 | Press beam |
| 9 | Bending die |
| 10 | Hydraulic cylinder |
| 11 | Hydraulic system |
| 12 | Workpiece |
| 13 | End position |
| 14 | End position |
| 15 | Bending angle |
| 16 | Distance measuring system |
| 17 | Fast stroke range |
| 18 | Die tip |
| 19 | Distance |
| 20 | Top face |
| 21 | Contact stroke |
| 22 | Forming stroke |
| 23 | Immersion depth |
| 24 | V-shaped female die opening |
| 25 | Foot |

-continued

| List of reference numbers | |
|---|---|
| 26 | Standing surface |
| 27 | Protective housing |
| 28 | Base plate |
| 29 | Housing top part |
| 30 | Access orifice |
| 31 | Pivot bearing arrangement |
| 32 | Actuating element |
| 33 | Spring arrangement |
| 34 | Stop means |
| 35 | End position |
| 36 | Arrow |
| 37 | Angle |
| 38 | Stop means |
| 39 | End position |
| 40 | Motion profile detection means |
| 41 | Linear potentiometer |
| 42 | Actuator drive |
| 43 | |
| 44 | |
| 45 | Logic module |
| 46 | Processor |
| 47 | Detection and evaluation circuit |
| 48 | Line |
| 49 | Pivot axis |
| 50 | Actuator |
| 51 | |
| 52 | Contact stroke |
| 53 | Return stroke range |
| 54 | |
| 55 | Switch means |
| 56 | End switch |
| 57 | Displacement range |
| 58 | Arrow |
| 59 | Control curve |
| 60 | Straight gradient |
| 61 | Gradient angle |
| 62 | Point |
| 63 | Curve |
| 64 | Straight gradient |
| 65 | Gradient angle |
| 66 | Pivot bearing arrangement |
| 67 | Stub shaft |
| 68 | Rotary potentiometer |
| 69 | Line |
| 70 | Signal transmitter and receiver module |
| 71 | Energy storage |
| 72 | Docking means |
| 73 | Angle of rotation transducer |
| 74 | Acceleration sensor |

The invention claimed is:

1. Control and regulating device for a drive arrangement of a displaceable press beam of a bending press, in particular a press brake, comprising a protective housing having an access orifice for a foot of an operator, and comprising a pedal-type actuating element disposed in the protective housing with a displacement range limited by end positions, and at least one detector assigned to the actuating element connected so as to communicate with a control and monitoring system of the bending press, and the detector is provided in the form of a motion profile detector connected to the actuating element so as to move in unison with it in order to detect position-related signals, wherein the motion profile detector is connected so as to communicate with a logic module incorporating a detection and evaluation circuit, and the processor is configured to generate control signals for a speed regulation of a displacing movement of a displaceable press beam of the bending press from the detected control signals and forward the control signals to the control and monitoring system of the bending press, and the displacement speed of the press beam is regulated on the basis of these control signals for defined stroke ranges of an overall displacement cycle of the press beam irrespective of a displacement speed stored in a data memory of the control and monitoring system as part of a program, and an acceleration profile of the displacing movement of the actuating element in the displacement range of the actuating element between the end positions is determined in the detection and evaluation circuit of the logic module from a time-related signal sequence of the motion profile detector and compared with a stored threshold value, and if the threshold value is exceeded, a control signal in the form of an emergency stop signal is generated and forwarded to the control and monitoring system of the bending press and the displacing movement of the press beam is halted as a result.

2. Control and regulating device according to claim 1, wherein the logic module is disposed in the protective housing of the control and regulating device.

3. Control and regulating device according to claim 1, wherein the logic module is disposed in the control and monitoring system of the bending press.

4. Control and regulating device according to claim 1, wherein the motion profile detector is provided in the form of an acceleration sensor coupled with the actuating element so as to move in unison with it.

5. Control and regulating device according to claim 1, wherein the motion profile detector is configured to detect a displacing movement of the actuating element via a linear potentiometer.

6. Control and regulating device according to claim 1, wherein the motion profile detector is configured to detect a displacing movement of the actuating element via a rotary potentiometer.

7. Control and regulating device according to claim 1, wherein the motion profile detector is configured to detect a displacing movement of the actuating element via an incremental rotary position transducer.

8. Control and regulating device according to claim 1, wherein the motion profile detector is configured to detect a displacing movement of the actuating element via an incremental linear distance measuring system.

9. Control and regulating device according to claim 1, wherein the motion profile detector is configured to detect a displacing movement of the actuating element via a scanner.

10. Control and regulating device according to claim 1, wherein the motion profile detector is provided in the form of a piezoelectric measuring sensor, in particular a micro-electro-mechanical system.

11. Control and regulating device according to claim 1, wherein the actuating element is mounted in a pivot bearing arrangement in the protective housing so as to be pivotable against the action of a rebound force of a spring arrangement about a pivot angle so as to be displaceable from an initial position into an end position.

12. Control and regulating device according to claim 11, wherein the motion profile detector is integrated in the pivot bearing arrangement.

13. Control and regulating device according to claim 11, wherein the motion profile detector is integrated in a linear guide arrangement of an actuator drive.

14. Control and regulating device according to claim 1, wherein output and input interfaces of the logic module of the control and regulating device and the control and monitoring system of the bending press each have a signal transmitting and receiving module.

15. Method of operating a bending press with a control and regulating device, with a protective housing having an access orifice for a foot of an operator and with a pedal-type actuating element disposed in the protective housing, and with at least one detector assigned to the latter connected so as to communicate with a control and monitoring system of the bending press, and position-related control signals are detected via at least one motion profile detector connected to the actuating element during displacement in a displacement range of the actuating element limited by end positions of the actuating element, wherein the control signals are generated in a processor of a detection and evaluation circuit of a logic module connected so as to communicate with the motion profile detector as control signals for a speed regulation of a displacing movement of a displaceable press beam of the bending press and forwarded to the control and monitoring system of the bending press, and the displacement speed of the press beam is regulated on the basis of these control signals for defined stroke ranges of an overall displacement cycle of the press beam irrespective of data pertaining to the displacement speed stored in a data memory of the control and monitoring system as part of a program, and an acceleration profile of the displacing movement of the actuating element in the displacement range of the actuating element between the end positions is determined in the detection and evaluation circuit of the logic module from a time-related signal sequence of the motion profile detector and compared with a stored threshold value, and if the threshold value is exceeded, a control signal in the form of an emergency stop signal is generated and forwarded to the control and monitoring system of the bending press and the displacing movement of the press beam is halted as a result.

16. Method according to claim 15, wherein the control signals are generated from a current intensity potential of the motion profile detector applied to the logic module incorporating the detection and evaluation circuit.

17. Method according to claim 15, wherein the control signals are generated from a current-voltage potential of the motion profile detector applied to the logic module incorporating the detection and evaluation circuit.

18. Method according to claim 15, wherein the control signals are generated from data of an angle of rotation transducer connected to the detection and evaluation circuit of the logic module.

19. Method according to claim 15, wherein the acceleration profile of the actuating element is derived in a processor of the logic module from a function of Delta "v (velocity)" to Delta "t (time)" from the motion profile of the actuating element and compared with the predefined threshold value for the displacing movement of the actuating element, and if the threshold value is exceeded, the control signal is generated as an emergency-off signal in the detection and evaluation circuit and transmitted to the control and monitoring system of the bending press.

20. Method according to claim 15, wherein the acceleration profile of the actuating element is determined in the logic module via measurement values of an acceleration sensor, in particular a micro-electro-mechanical system.

* * * * *